United States Patent [19]

Boggs

[11] 3,899,219

[45] Aug. 12, 1975

[54] SELF-CLEANING SPROCKET MEANS

[75] Inventor: Roger L. Boggs, East Peoria, Ill.

[73] Assignee: Caterpillar Tractor Co., Peoria, Ill.

[22] Filed: May 28, 1974

[21] Appl. No.: 474,002

[52] U.S. Cl. .................................. 305/13; 74/243 R
[51] Int. Cl.² ............................................ B60S 1/62
[58] Field of Search ........... 305/11, 12, 13; 180/6.7, 180/9.62; 74/243 R, 243 C, 247

[56] References Cited
UNITED STATES PATENTS

| 301,743 | 7/1884 | Michael | 305/11 |
| 1,201,748 | 10/1916 | Luce | 74/243 R |
| 2,599,233 | 6/1952 | Christie | 305/11 |
| 3,068,711 | 12/1962 | Even | 74/243 C |
| 3,120,409 | 2/1964 | Beall | 305/13 |
| 3,486,574 | 12/1969 | Baron | 305/13 |

Primary Examiner—Philip Goodman
Assistant Examiner—John A. Carroll
Attorney, Agent, or Firm—Phillips, Moore, Weissenberger Lempio & Strabala

[57] ABSTRACT

A vehicle includes a sprocket member and an endless traction chain engaged therewith, the sprocket member being made up of an annular sprocket and detachable toothed segments, such sprocket being provided with openings in communication with openings provided in the segments. Such openings provide that the sprocket member is self-cleaning, with debris passing through the openings outwardly of the sprocket member.

5 Claims, 3 Drawing Figures

PATENTED AUG 12 1975
3,899,219
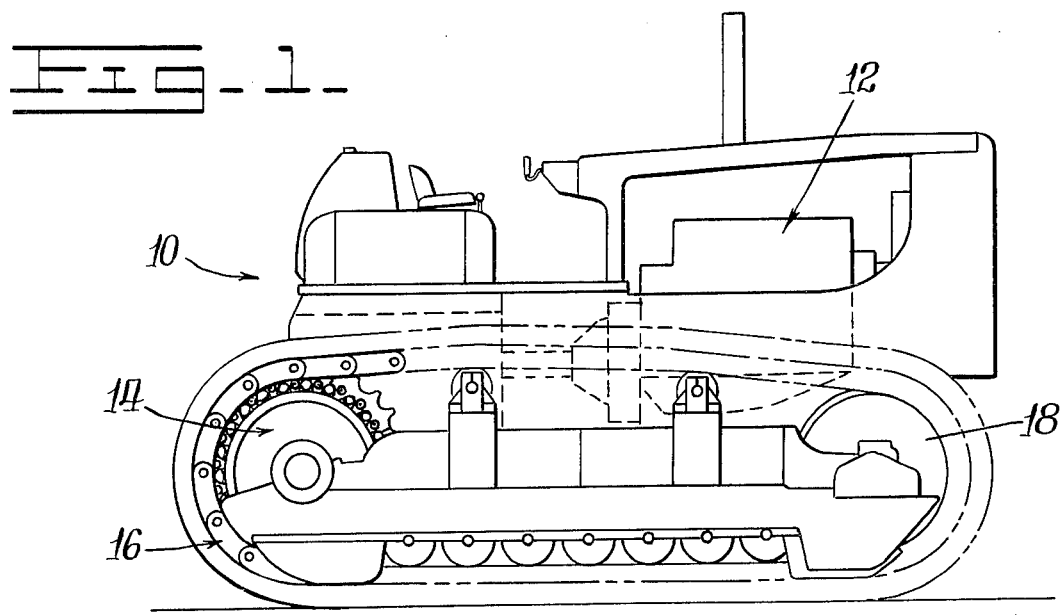
Fig_1_
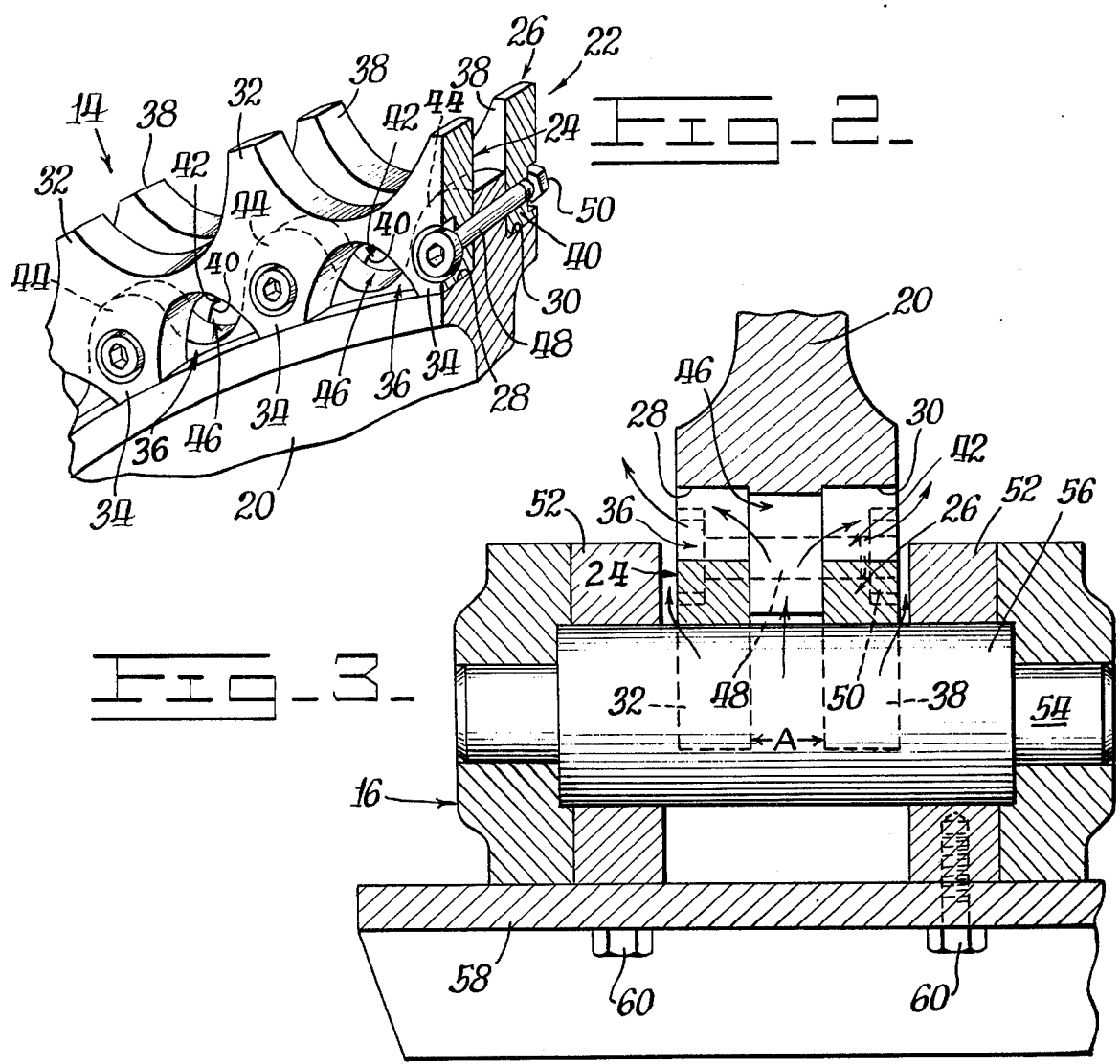
Fig_2_
Fig_3_

SELF-CLEANING SPROCKET MEANS

BACKGROUND OF THE INVENTION

This invention relates to a self-cleaning sprocket means for a tractor, and more particularly to detachable toothed segments disposed end-to-end about shoulders of a sprocket, which segments include mounting flanges defining openings to be aligned with complimentary openings defined by mounting flanges on the sprocket to provide means to discharge debris from the sprocket hub.

Certain well-known crawler tractors and other earthmoving machines utilize a pair of laterally spaced endless traction chains each of which is operatively maintained and activated by means of a plurality of supporting track rollers and longitudinally disposed idler wheels and toothed drive sprockets. These motive means include any one of several well-known means to reduce dirt and other foreign matter buildup on the sprocket members which result in pitch mismatch of the endless traction chain engaged therewith, as well as accelerated wear, loss of power and unduly high stresses to the track components. This problem is more serious in sealed and lubricated track where internal joint wear is eliminated. In unsealed track, the pitch growth due to internal wear partly compensates for the dirt or foreign matter buildup. (See generally: U.S. Pat. No. 2,034,125 to Wickersham.)

Proposals have been made to meet this problem by offering well-known snow sprockets or special sprockets having undercut roots; however, both of these applications result in increased bushing and sprocket member wear in situations where no dirt or foreign matter buildup occurs.

Conventionally, in order to prevent undesirable pitch mismatch caused by dirt or other foreign matter buildups on the sprocket members, various aperture patterns and sprocket configurations have been attempted, including apertures feeding the debris inwardly to the sprocket hub. This, however, has the undesirable side-effect of directing the debris to the sprocket hub, where various surfaces are exposed to the grit, with the undesirable side-effect of high wear characteristics. (See generally: U.S. Pat. No. 2,003,528 to Best; 3,057,219 to Montgomery; 2,034,125 to Wickersham; and 3,333,903 to Orr, et al.)

Certain devices utilize various shapes of sprocket to minimize this effect and the undesirable side-effect of a less than maximum unit strength of the sprocket results. (See for examples U.S. Pat. No. 3,333,903 to Orr, et al.)

SUMMARY AND OBJECTS OF THE INVENTION

Accordingly, an object of this invention is to provide an effective, inexpensive and easy to manufacture self-cleaning sprocket means for tractors and like endless traction chain driven machines.

Another object of this invention is to provide a self-cleaning sprocket means having a plurality of detachable segments defining a plurality of sprocket teeth, which segments can be flamecut from standard flat stock.

Another object of this invention is to provide mounting flanges and matching tooth segments of such a thickness that no detrimental concentrated loads or stress risers result from operating loads or heat treatment.

Yet another object of this invention is to provide co-acting segments of such a thickness and being disposed in close proximity to the inner links of an endless traction chain that relatively low unit surface and shear loading of the bushings is maintained.

Wherefore applicant provides a tractor having a sprocket member and an endless track cooperatively engaged with the sprocket member. The sprocket member comprises an annular sprocket hub and detachable sprocket tooth defining means. The tooth defining means includes a plurality of spaced-apart first flanges defining a plurality of first open portions. The sprocket hub defines a plurality of spaced-apart second flanges defining a plurality of second open portions thereon. The sprocket tooth defining means are positionable relative to the sprocket hub so that the second open portions are positioned adjacent the first open portions and communicate with them. Means are included in applicant's invention to detachably securingly interconnect the sprocket tooth defining means to the sprocket hub, with the second open portions in communication with the first open portions; whereby the sprocket member provides self-cleaning means.

BRIEF DESCRIPTION OF THE DRAWINGS

Other objects of this invention will become apparent from the following description and drawings, wherein:

FIG. 1 is a longitudinal view of a tractor incorporating the preferred embodiment of the invention;

FIG. 2 is a perspective view of a portion of the apparatus of FIG. 1 illustrating the preferred embodiment of the invention; and FIG. 3 is an anterior sectional view of the invention engaged with an endless traction chain in the preferred embodiment and illustrating the ejectment of dirt or foreign material from the sprocket member.

DESCRIPTION OF THE PREFERRED EMBODIMENT

Referring to FIG. 1, a tractor 10 is motivated in well-known fashion by means of an engine and power train 12 which transmits power under selective operator control through sprocket members 14 (only one shown) cooperatively engaged with ground-engaging endless traction chains 16 (only one shown) laterally disposed on a longitudinal axis of the tractor 10 in well-known fashion. Front idlers 18 (one shown) are also engaged with the chains 16.

As will be seen in the perspective view of FIG. 2, sprocket member 14 disposed at one end of the tractor 10 comprises generally an annular sprocket hub 20 and tooth defining means 22. The tooth defining means 22 includes generally a first plurality of arcuate segments 24 and a second plurality of arcuate segments 26. The first plurality of arcuate segments 24 are deployed in end-to-end relation about one side of an annular periphery of the sprocket hub 20 on a first annular shoulder 28 thereof. The second plurality of arcuate segments 26 are spaced-apart laterally of the first plurality of arcuate segments 24, and are generally parallel thereto, defining a predetermined space A therebetween, and are deployed on the periphery of the sprocket member 20 on a second annular shoulder 30 in end-to-end relation.

The first plurality of arcuate segments 24 have a plurality of sprocket teeth 32, a plurality of longitudinally spaced-apart flanges 34, and an open portion 36 between each adjacent pair of flanges 34. The second plurality of arcuate segments 26 have a plurality of teeth 38, a plurality of longitudinally spaced-apart flanges 40, and an open portion 42 between each adjacent pair of spaced-apart flanges 40.

The first and second plurality of arcuate segments 24 and 26, respectively, are mountable on the sprocket hub 20 by detachably interconnecting the flanges 34, 40 to a plurality of flanges 44 formed by the annular periphery of the sprocket hub 20. In the preferred embodiment of the invention, the plurality of flanges 44 being generally lobe-shaped and spaced-apart longitudinally define an open portion 46 between each adjacent pin of these flanges 44.

The segments 24, 26 are positioned relative to the hub 20 so that the plurality of open portions 36, 42 are positioned so as to be in communication with the plurality of open portions 46. The segments 24, 26 are detachably secured to the hub 20, retaining bolts 48 and nuts 50, each bolt and nut securing a flange 34 and a flange 40 to a flange 44.

As will be seen in the anterior cross-sectional view of the preferred embodiment of FIG. 3, the traction chain 16 normally comprises a plurality of laterally disposed and longitudinally spaced articulating links 52 joined at each end by means of a plurality of coacting pressfitted hinge pins 54 and bushings 56. Ground-engaging track shoes 58 are securingly attached to surfaces of said articulating links 52 by means of a plurality of bolts 60 accepted in cooperating bores defined by surfaces of said arcitulating links 52. Motive force is selectively provided for the tractor 10 by means of engine and power train 12 causing the sprocket teeth 32 and 38, respectively, to rotatively extend into openings between the cooperating traction chain articulating links 52 in well-known fashion to engage the bushings 56 and effect a powerful propelling force, which force is transmitted to the ground.

Referring to the diagrammatic flow arrows of FIG. 3, it will be seen that the dirt or other foreign matter carried from a work surface by traction chain 16 components into the sprocket hub 20 and subsequently undesirably packed therein by track bushing 56 during operation of the tractor 10 is enabled to flow radially inward from the roots of the sprocket teeth 32 and 38, respectively, and/or past the arcuate segments 24 and 26, respectively, and be ejected therefrom by means of lateral flow outward through the open portions 36, 42, formed in the segments 24 and 26, respectively.

An approximately ½ inch clearance between the traction chain articulating links 52 and the segments 24 and 26, respectively, in addition to the described flanges and open portions, allows a continuous inward flow of dirt or foreign matter, minimalizing undesirable collection of foreign matter.

What is claimed is:

1. A tractor having a sprocket member and an endless traction chain cooperatively engaged with said sprocket member, said sprocket member comprising
   a sprocket hub;
   sprocket tooth defining means defining a plurality of spaced-apart first flanges defining a plurality of first open portions;
   the sprocket hub defining a plurality of spaced-apart second flanges defining a plurality of second open portions, said sprocket tooth defining means being positionable relative to said sprocket hub so that said second open portions are positioned adjacent said first open portions and communicate therewith; and
   means for detachably securingly interconnecting said sprocket tooth defining means relative to said sprocket hub with the second open portions in communication with the first open portions;
   whereby said sprocket member provides self-cleaning means.

2. The apparatus of claim 1 wherein said sprocket tooth defining means comprise a plurality of generally arcuate segments disposed end-to-end on one side of the sprocket hub.

3. The apparatus of claim 2 wherein said sprocket tooth defining means further comprise a second plurality of generally arcuate segments disposed end-to-end on the other side of the sprocket hub, and spaced from said first-mentioned plurality of segments.

4. The apparatus of claim 2 wherein the means for detachably interconnecting the sprocket tooth defining means to the sprocket hub comprise means for detachably interconnecting the first flanges to the second flanges.

5. The apparatus of claim 4 wherein the means for detachably interconnecting the first flanges to the second flanges comprise bolt means disposed through bores defined by the first and second flanges, and nut means associated with said bolt means.

* * * * *